United States Patent
Eddy

(10) Patent No.: US 8,230,758 B1
(45) Date of Patent: Jul. 31, 2012

(54) MULTIPLE AXIS ADJUSTABLE HANDLEBARS AND HANDLEBAR MOUNTING RISERS

(76) Inventor: Harry Greb Eddy, Limington, ME (US)

(*) Notice: Subject to any disclaimer, the term of this patent is extended or adjusted under 35 U.S.C. 154(b) by 1054 days.

(21) Appl. No.: 11/465,863

(22) Filed: Aug. 21, 2006

Related U.S. Application Data

(60) Provisional application No. 60/710,050, filed on Aug. 22, 2005.

(51) Int. Cl.
*B62K 21/16* (2006.01)
*B62K 21/12* (2006.01)

(52) U.S. Cl. ...................... 74/551.3; 74/551.1

(58) Field of Classification Search ...... 74/551.3–551.7, 74/551.1; 280/47.315, 47.371; 482/57, 62, 482/139; 16/426, 900, 430
See application file for complete search history.

(56) References Cited

U.S. PATENT DOCUMENTS

| | | | |
|---|---|---|---|
| 578,180 A | | 3/1897 | Wood |
| 613,014 A | * | 10/1898 | Martyn .................. 74/551.4 |
| 1,756,339 A | | 4/1930 | Broberg |
| 3,863,521 A | | 2/1975 | Gatsos et al. |
| 4,023,436 A | * | 5/1977 | Dodge ................... 74/551.3 |
| 4,361,057 A | | 11/1982 | Kochera |
| 4,688,817 A | | 8/1987 | Marier |
| 5,297,445 A | * | 3/1994 | Chen ..................... 74/551.3 |
| 5,685,201 A | | 11/1997 | Renshaw |
| 6,192,773 B1 | * | 2/2001 | Liao ...................... 74/551.3 |
| 6,244,131 B1 | * | 6/2001 | Liao ...................... 74/551.3 |
| 6,588,297 B1 | | 7/2003 | Day et al. |
| 6,920,806 B2 | * | 7/2005 | Cutsforth ................ 74/551.8 |
| 7,343,831 B1 | | 3/2008 | Tamcsin |
| 2003/0070505 A1 | * | 4/2003 | Meinecke et al. ........ 74/551.1 |
| 2003/0075372 A1 | * | 4/2003 | Kurohori et al. .......... 180/219 |
| 2003/0084746 A1 | | 5/2003 | Cutsforth |
| 2004/0016316 A1 | | 1/2004 | Bechler |
| 2009/0188344 A1 | | 7/2009 | Tamcsin |

FOREIGN PATENT DOCUMENTS

| | | | |
|---|---|---|---|
| DE | 4336485 A1 | * | 6/1994 |
| EP | 53667 A1 | * | 6/1982 |
| EP | 0 092 811 A1 | | 2/1983 |
| WO | 9003302 | | 4/1990 |

OTHER PUBLICATIONS

Description DE4336485. Jul. 26, 2011. European Patent Office. http://translationportal.epo.org/emtp/translate/?ACTION=description-retrieval&COUNTRY=DE&FORMAT=docdb&KIND=A1&LOCALE=en_EP&NUMBER=4336485&OPS=ops.epo.org&TRGLANG=en&ENGINE=google&SRCLANG=de.*
Yamaha XVZ12TK Owner's Manual, 4 pages, 1983.
Ronnie's Mail Order Warehouse, 1983 Yamaha XVZ12TK Handlebar Cable, www.ronniesmailorder.com/fiche_section_popup.asp?fveh=4522&..., Oct. 11, 2011, 2 pages.
Helibars, Horizon high-performance handlebars brochure, 1 page.
Heli Modified, Inc., Helibars Handlebars for the Long Haul Price Sheet, Oct. 2011, 4 pages.
Helibars, Horizon Standard & Rebel Installation Instructions, Jul. 7, 2011, 8 pages, Cornish, ME.

* cited by examiner

*Primary Examiner* — Richard W Ridley
*Assistant Examiner* — Daniel Yabut
(74) *Attorney, Agent, or Firm* — Maine Cernota & Rardin

(57) ABSTRACT

A multi-adjustable handlebar and handlebar mounting riser assembly that rotates and pivots about multiple axes. This offers a high degree of adjustability by utilizing multiple adjusting members while integrating a number of elements to enhance safety and control. These include alignment keys, anti-separation grooves, caps, and stops as well as rotation stops.

19 Claims, 14 Drawing Sheets

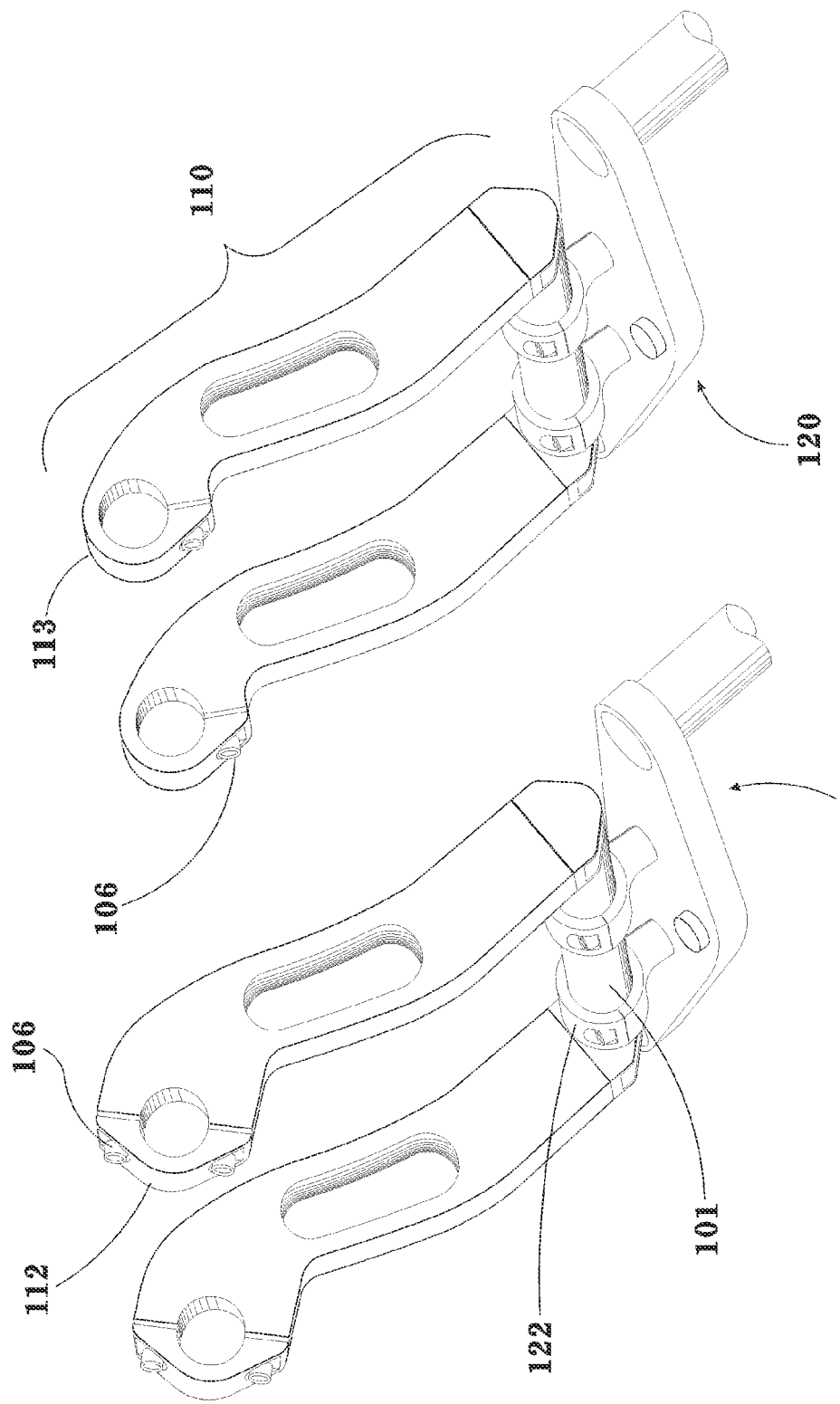

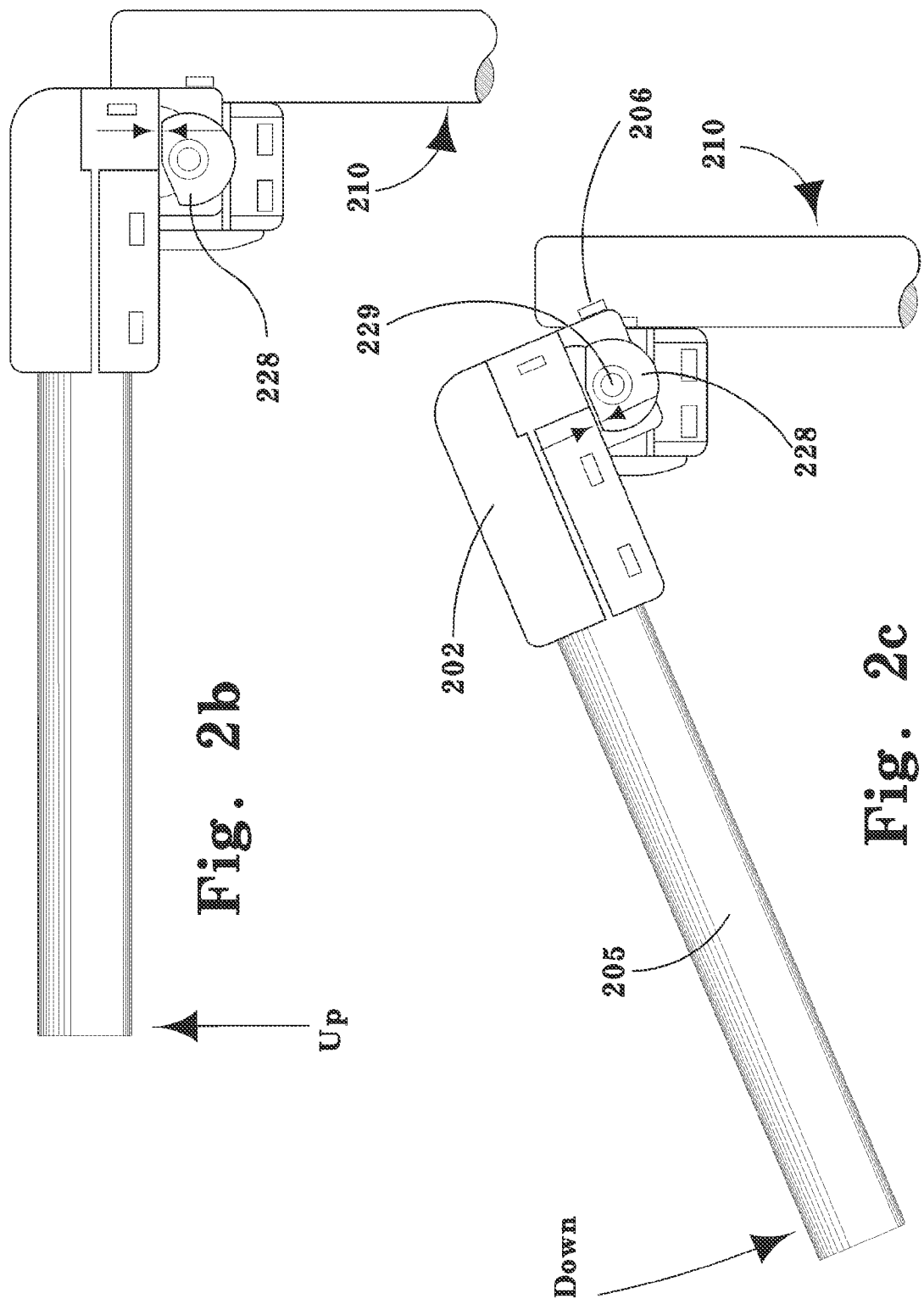

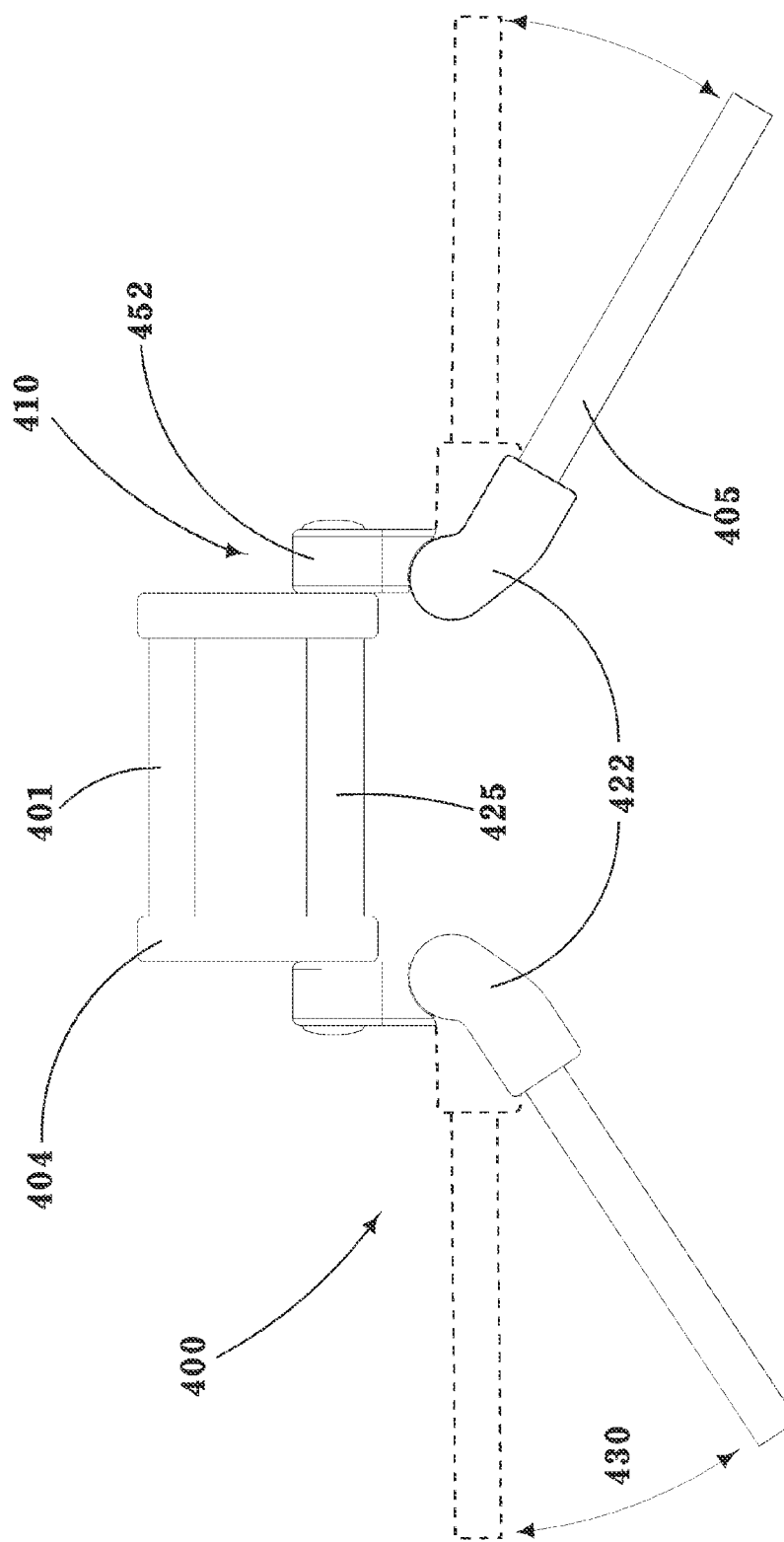

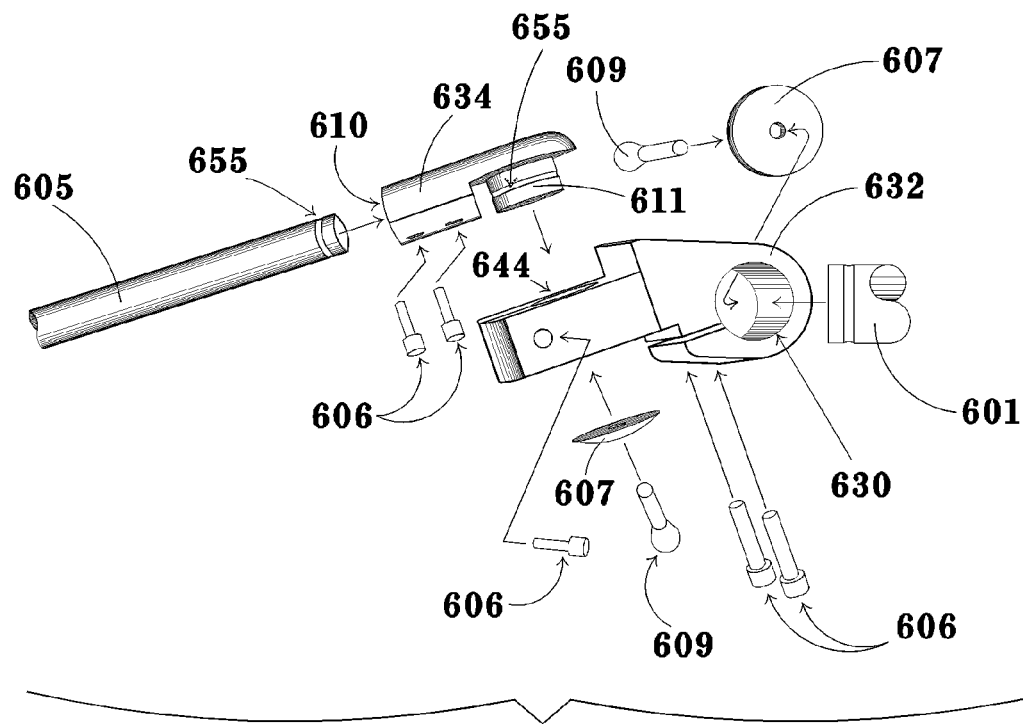
Fig. 6a
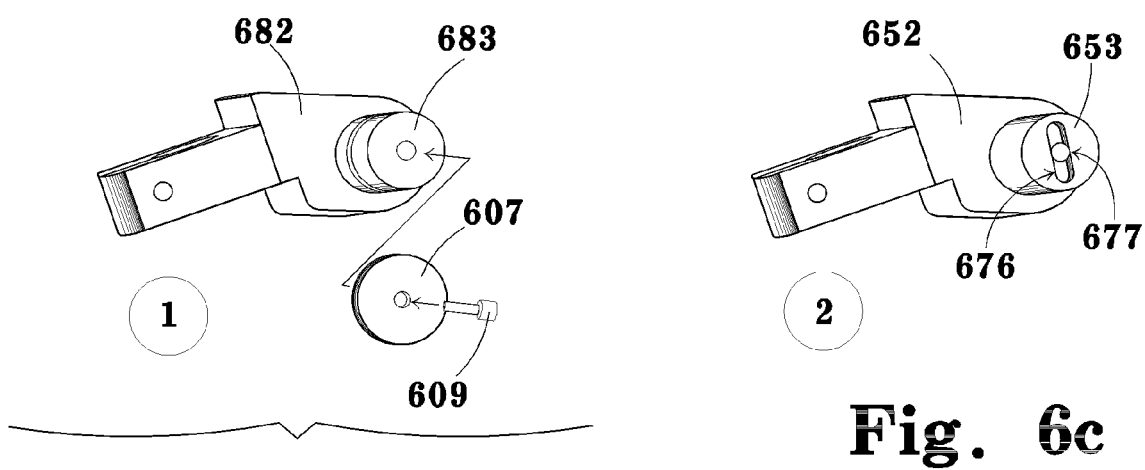
Fig. 6b
Fig. 6c

MULTIPLE AXIS ADJUSTABLE HANDLEBARS AND HANDLEBAR MOUNTING RISERS

RELATED APPLICATIONS

This application claims the benefit of U.S. Provisional Application No. 60/710,050, filed Aug. 22, 2005, which is herein incorporated in its entirety by reference.

FIELD OF THE INVENTION

The present invention generally relates to handlebars. More particularly, the present invention relates a multi-access adjustable handlebar and a handlebar mounting riser for motorcycles and similar vehicles.

BACKGROUND OF THE INVENTION

Various mechanisms have been devised to steer vehicles such as motorcycles, snowmobiles, ATVs, mopeds, scooters, bicycles, and other similar apparatus. One such steering mechanism involves a handlebar connected to a fork, which, in turn, is connected to the axle and wheel of a motorcycle or the ski of a snowmobile. The fork rotates about an axis generally perpendicular to the riding surface. Turning the handlebar rotates the fork and pivots the wheel to the desired direction.

Typically, a unitary handlebar is connected to the steering head or triple clamp (tree) of a fork by connecting means such as clamps. Such assemblies may come in a variety of fixed heights, widths, lengths, and angles to accommodate riders of varying sizes and riding styles.

There have been several attempts at multi-adjustable handlebars. Equipped with such a handlebar, a vehicle can accommodate riders of differing heights, arm lengths, etc. Additionally, the same individual may adjust the handlebar to improve aerodynamics or to enhance riding comfort.

However, it is apparent that some adjustable handlebar designs suffer from certain disadvantages as to practicality, safety, or weight considerations. For example, U.S. Pat. No. 4,361,057 discloses a single-pivot drop-style bicycle handlebar adjustable between a downward or racing position and an upward position for touring or general use. A disadvantage of such a limited, single-axis, pivotal mounting systems is that the handlebars experience substantial rotation about a horizontal axis as they are adjusted up, down, front or back. As a result, the handlebars are moved out of a desired orientation into an inconvenient and uncomfortable orientation. Also, gauges, controls and the like mounted on the handlebars may be rotated out of their initial positions.

In addition, safety features were not typically considered in prior designs. Safe vehicle performance is especially important in motorcycle operation. Few other activities expose a (mostly) unprotected operator to streams of traffic including multi-ton vehicles traveling over 60 miles per hour. Safety can be divided into two categories, normal operational performance and degraded performance. Normal operational performance considers the controllability of the vehicle during normal operation. Degraded performance considers vehicle controllability in an abnormal situation. Each should be considered in a handlebar assembly design.

Considering safety during normal operational performance, previous adjustable handlebar assemblies could flex excessively due to weight-saving designs. While excessive weight is a concern, excessive flex is notably relevant to safety. U.S. Pat. No. 4,023,436 discloses unbraced rotating tubular projections independently supporting handgrips at their extremities. Avoiding flex is important because motorcycles are steered through handlebar rotation. Body lean also determines the direction of travel, and complicating this is countersteering that is required to initiate a turn. In countersteering, the fork must first be briefly turned in the direction opposite the turn to initiate it. It is then turned back to the direction of the turn. This rapid back and forth rotation can result in oscillations if the tire/fork/riser/handlebar assembly flexes excessively. Included with this are the gyroscopic forces of the front wheel that must be overcome. Flex-resistance needs to be a consideration of any safe handlebar assembly, and lightweight and flex-resistance are features for safety and performance.

Safety with respect to degraded performance considers vehicle controllability in an abnormal situation. Previous adjustable handlebar assemblies typically exhibited single point failure modes. If one bolt or attaching screw loosened or broke, the result would be a catastrophic joint failure. Additionally, existing designs included protruding surfaces that are not only a safety concern but also aesthetically unappealing. Related to this is the effect of a loosened, not failed, joint of an adjustable handlebar. Without a feature such as a stop to limit movement, a loosened joint may rotate 360 degrees, resulting in uncontrollability. Stops can typically provide enough control to safely stop a hampered vehicle.

Furthermore, the adjustability of the handlebar also impacts the safety as normal handlebars are designed for a certain height and arm length. Those that are outside of the design criteria, particularly women, may not be in the ideal position for operation.

What is needed, therefore, is an adjustable handlebar system that alleviates or diminishes the problems noted in the state of the art and provides a safe assembly that allows for user adjustability. Such a system should be aesthetically pleasing and accommodate adjustments in multiple axes to satisfy the user requirements.

SUMMARY OF THE INVENTION

One embodiment of the present invention provides a multi-adjustable handlebar and handlebar mounting riser assembly that rotates and pivots about multiple axes. Additional embodiments may employ a handlebar assembly and a mounting assembly separately.

One embodiment of the invention is a multi-axis adjustable handlebar system including a riser unit having a pair of riser sides coupled together by a lower crossbar and an upper crossbar, wherein the lower crossbar is rotatably connectable to a steering mount. There is a compound member coupled to the riser unit proximate the upper crossbar, wherein the compound member provides a first degree of movement in a limited first range. A pivot member is also coupled to the compound member, wherein the pivot member provides a second degree of movement in a limited second range. And, there is a handle connectable to the pivot member.

The compound member can further include a pivot stub engaging a bore in the riser sides. In addition, the pivot member and the compound member can together provide a forward stop and a back stop enabling the limited second range. The pivot member may use a rotational stop washer to provide the limited second range.

Another embodiment is a multi-axis adjustable handlebar apparatus having a first rotational member providing rotation about a handlebar mounting member. There is a second rotational member rotatably coupled to the first rotational member via a pivot stub engaging a first connecting bore, thereby providing rotation about the pivot stub. The handle portion can be coupled to the second rotational member wherein the handle portion engages a receiving bore on the second rotational member.

The pivot stub can include a first anti-separation groove. The pivot stub may even have a threaded bore to receive a cap fastener. In another variation, there can be at least one rotation stop interposed between the first rotational member and the second rotational member.

A further embodiment includes a multi-axis adjustable handlebar with a first rotational member providing rotation about a handlebar mounting member, a second rotational member rotatably coupled to the first rotational member via a pivot stub engaging a first connecting bore, thereby providing rotation about the pivot stub. A third rotational member can be rotatably coupled to the second rotational member via a connecting stub engaging a second connecting bore, thereby providing rotation about the connecting stub.

The handlebar may also have a handle portion coupled to the third rotational member wherein the handle portion engages a receiving bore on the third rotational member.

The connecting stub may include a first anti-separation groove. The pivot stub may use a threaded bore to receive a cap fastener. Also, the anti-separation stop can be threadably received by the connecting stub.

A further variation includes at least one rotation stop interposed between the first rotational member and the second rotational member. Another aspect includes at least one rotation stop interposed between the second rotational member and the third rotational member. There can also be a first connecting bore and the second connecting bore wherein they are oriented approximately orthogonal to one another.

An embodiment of the invention is a multi-axis adjustable handlebar system with a first rotational member having at least one pivot stub, a second rotational member having a first connecting bore oriented substantially orthogonal to a second connecting bore. The pivot stub may include a first anti-separation groove. The second rotational element is typically rotatably coupled to the first rotational member via the pivot stub and the first connecting bore. A third rotational member may have a receiving bore about one end to receive a handle portion. The connecting stub can be located about the other end of the third rotational member and oriented approximately orthogonal to the receiving bore, the connecting stub having a substantially axially aligned threaded bore on one face. An anti-separation stop can be threadably received by the connecting stub. There can also be a forward stop interposed between the second rotational member and the third rotational member. Also, a back stop can be interposed between the second rotational member and the third rotational member.

Another aspect includes a cap positioned over the pivot stub and fastened to the pivot stub with a cap fastener. The cap may be positioned over the pivot stub and fastened to the pivot stub with a cap fastener.

An example of one embodiment is a multi-axis adjustable handlebar with a first rotational member having at least one pivot stub. It also includes a second rotational member with a first connecting bore oriented approximately orthogonal to a second connecting bore. The pivot stub including a first anti-separation groove. The second rotational element is rotatably coupled to the first rotational member via the pivot stub and the first connecting bore. Additionally, a third rotational member with a receiving bore on one end to receive a handle. A cap is positioned over the pivot stub and fastened to the pivot stub with a cap fastener. A connecting stub is located at the other end of the third rotational member and oriented approximately orthogonal to the receiving bore. The connecting stub having a substantially axially aligned threaded bore on one face and an anti-separation stop screwed into it. Finally with forward and back stops between the second rotational member and the third rotational member.

The features and advantages described herein are not all-inclusive and, in particular, many additional features and advantages will be apparent to one of ordinary skill in the art in view of the drawings, specification, and claims. Moreover, it should be noted that the language used in the specification has been principally selected for readability and instructional purposes, and not to limit the scope of the inventive subject matter.

BRIEF DESCRIPTION OF THE DRAWINGS

FIG. 1b is another perspective view of a multi-adjustable handlebar assembly mounted on a handlebar riser assembly that is mounted to a steering head in accordance with another embodiment of the present invention.

FIG. 1c is a further perspective view of the multi-adjustable handlebar assembly mounted on a handlebar riser assembly that is mounted to a steering head in accordance with a further embodiment of the present invention.

FIG. 2b is a view of the handlebar stopped at the upper position in accordance with an embodiment of the present invention.

FIG. 2c is a view of the handlebar stopped at the lower position in accordance with an embodiment of the present invention.

FIG. 4a is a top-down view of the handlebar and riser assembly in accordance with an embodiment of the present invention

FIG. 6a is an exploded perspective view of the axis multi-adjustable handlebar assembly joints in accordance with a 2-axis embodiment of the invention in which the compound member can be mounted by insertion of a crossbar member into a hole in the compound member;

FIG. 6b is an exploded perspective of view of a compound member in a 2 axis embodiment wherein the compound member can be attached to a bore of a handlebar riser assembly via a mounting stub;

FIG. 6c is a perspective of view of a compound member in a 2 axis embodiment wherein the compound member can be attached to the upper crossbar of a handlebar riser assembly via a handlebar mounting stub;

DETAILED DESCRIPTION

The following nomenclature is provided for convenience in reviewing the figures. It is not intended to be limiting. Directions are typically from an operator's perspective unless otherwise indicated. Front views are of the front of the vehicle, looking back toward it. Forward views are looking toward the front of the vehicle from the operator's position. Top-down views are from above the operator, looking down. Bottom-up views are from generally below the operator looking up.

Movable connections will be referred to as either rotating or pivoting. Connections may turn about the axis of a shaft such as a tube. Other connections turn about the axis of a pin or stub. Joints are pivoting or rotating connections incorporating a stub within a concentric receiving bore. By constricting the bore diameter with, for example, pinch bolts, the stub is held and the joint is immobilized from pivoting/turning. Similarly, caps or brackets may be tightened around a shaft to prevent the connection from rotating/turning.

Figure 1A:
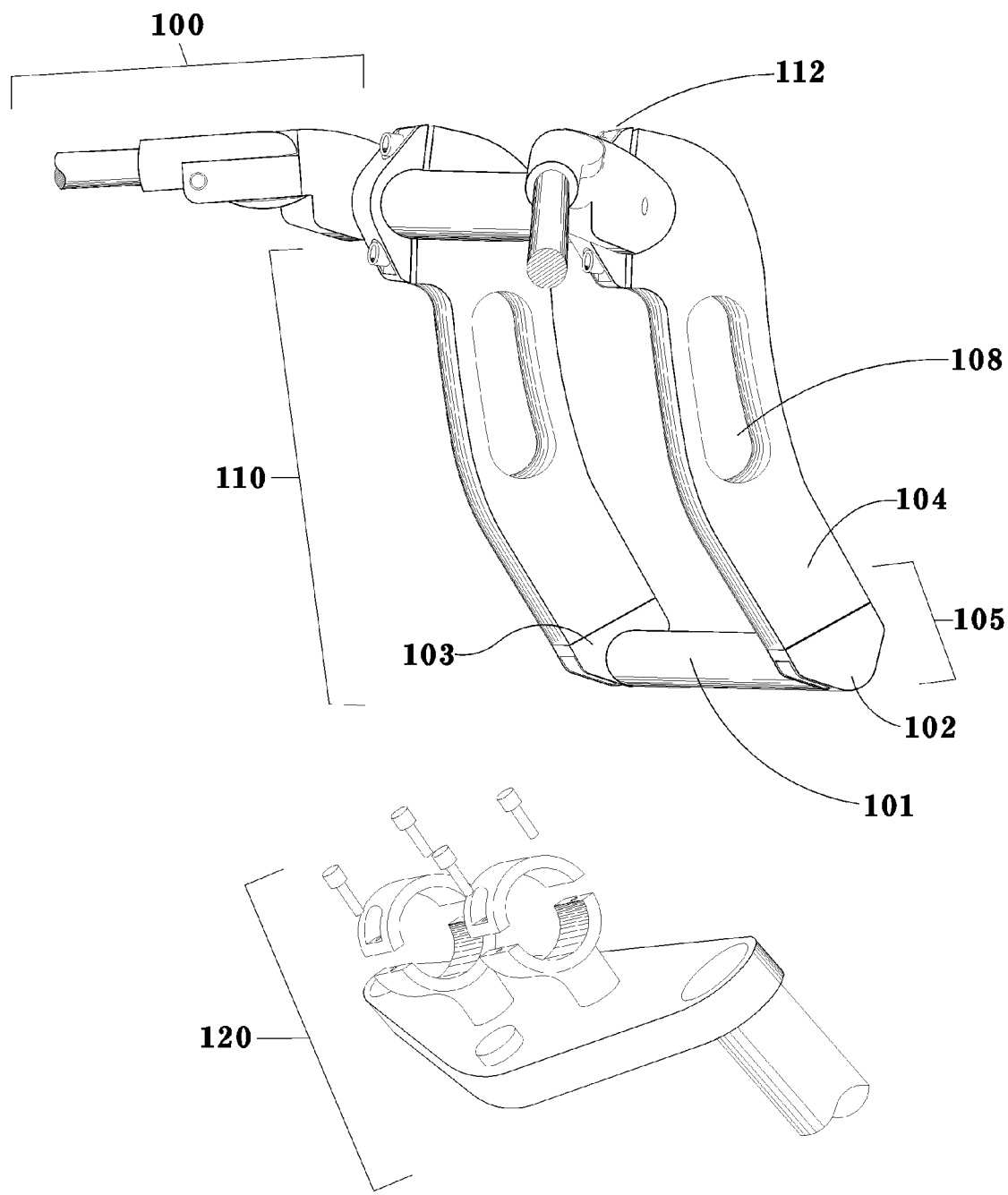
FIG. 1a is a perspective view of a multi-adjustable handlebar assembly mounted on a handlebar riser assembly that is mounted to a clamp steering head in accordance with an embodiment of the present invention.

FIG. 1a displays a perspective view of the three groups of components. A multi-adjustable handlebar assembly 100, a handlebar mounting riser assembly 110, and a steering head 120. Handlebar riser mounting assembly 110 supports rotation about at least two axes. One at its lower connection to the steering head 120, and a second at its upper connection to multi-adjustable handlebar assembly 100.

Adapter unit 105 of handlebar mounting riser assembly 110 is designed to facilitate mating to the steering device 120, typically of a vehicle. The vehicle may be a motorcycle, moped, ATV, 4-wheeler, scooter, or similar. One of ordinary skill in the art should readily appreciate that the present invention applies to other steering or control devices as well, and the interpretation of vehicle is to be taken in the broadest context. Various securing mechanisms are operable within the scope of the invention for fastening the handlebar mounting riser assembly 110 to the steering device 120. Steering device 120 may be from an original equipment manufacturer (OEM) or an aftermarket accessory.

Adapter unit 105 typically comprises lower crossbar mounting tube 101 coupled to riser mounts 102, wherein the adapter unit 105 may be clamped or otherwise affixed to handlebar mounting riser assembly 110. The steering device 120 can couple to the lower crossbar mounting tube 101 by various clamping mechanisms.

In one embodiment the riser mounts are affixed to the lower crossbar 101 by weldments 103. Weldments 103 may be strengthened by internal plugs (not shown). Alignment keys (not shown) may also be included. Assembled and fastened/welded together, lower crossbar mounting tube 101 and riser mounts 102 can form a single adapter unit 105. Mounting tube 101 and riser mounts 102 may be cast, forged or otherwise made or fabricated as a single unit. Riser mounts 102 can be drilled to permit bolts to secure adapters 102 to handlebar risers 104 and, alternatively, to mounting tube 101. The coupling between the handlebar risers 104 and the adapters 102 can be accomplished using other known techniques. The dimensions and other specifications for mounting tube 101, riser mounts 102, and risers 104 are dictated by the particular application. In one embodiment, the entire height of the riser assembly 110 is approximately eight inches with each riser mount 102 approximately one inch and lower crossbar mounting tube 101 length approximately six inches.

At their upper ends, handlebar risers 104 incorporate handlebar clamps 112. Clamps 112 may be a single or a two-piece clamp 112 wherein an upper portion of the handlebar riser 104 can define a portion of the clamp 112. A top clamp cap can be used for the two-piece clamp 112 and secured, for example, by a pair of bolts. In a single-piece clamp, a pinch bolt can provide the securing mechanism. Handlebar riser 104 and the top clamp cap 112 may be fastened together using bolts. The completed clampable bore 112 is sized to securely hold a handlebar or intervening joints when bolts are tightened.

As indicated in FIG. 1c, in the single-piece embodiment, the upper ends of handlebar risers 104 may define a capless bore sized so that a handlebar may slide freely in and out when the clamps are opened, but is securely clamped in place when closed. Tightening or loosening may be accomplished by pinch bolts. One of ordinary skill in the art should readily appreciate that other attaching embodiments in addition to those described herein are all within the contemplation of the present invention. Handlebar riser 104 may be made from, but not limited to, aluminum, steel, or titanium. Handlebar risers 104 may be independent from riser mounts 102 and mounting tube 101, enabling handlebar risers 104 to be made from a material dissimilar from that used to make riser mounts 102 and mounting tube 101. As an example, handlebar risers 104 may be aluminum, steel, or titanium while riser mounts 102 and mounting tube 101 may be steel. They could, for example, be manufactured from a solid Aluminum billet.

The physical dimensions of handlebar riser mounting assembly 110 may be dictated by a rider's shape, height and riding style. While the figures herein disclose handlebar riser 110 of a general profile, handlebar risers 104 may be straight or arced, or incorporate an s-bend or other geometric shape satisfying a mechanical specification or artistic conception. Thus, the aesthetic characteristics of the riser 110 can enhance the style and character of the vehicle. There may be cut-outs or holes 108 in the riser 104 for aesthetic, material, or weight reduction considerations. It may be designed with upper clamp bolts located out of the operator's sight.

Continuing with FIG. 1a, a handlebar 100 is typically coupled indirectly to the steering device 120 wherein a clamp 112 secures the handlebars to the riser assembly 100 and then to the steering column 120. There are various other clamping/coupling mechanisms known in the art for mating the handlebars 100 to the riser 110 and to the steering mechanism 120. The handlebars 100 can include additional pivoting structures or joints (not shown) allowing even further flexibility in design.

With the handlebars 100 mounted to the top of the handlebar riser mounting assembly 110, both handlebar 100 and the handlebar riser mounting assembly 110 can be adjusted together or independently to alter the hand control position up, down, forward and backward. Handlebar riser mounting assembly 110 becomes an intermediary mechanism between the steering device 120 and handlebars 100, allowing greater flexibility and variations for coupling different handlebars to a particular steering device 120. Having a coupling between the steering device 120 and handlebar riser mounting assembly 110 allows a first rotational degree of freedom. Having a coupling between handlebar riser mounting assembly 110 and handlebar 100 provides a second rotational degree of freedom. This rotation may be limited by stops described in more detail in FIGS. 6a and 6b.

Referring to FIG. 1b and FIG. 1c, other perspective embodiments are shown. The lower riser crossbar mounting tube 101 is engaged by the steering device 120 by two locking clamps 122. The locking clamps 122 fixedly attach the riser mounting assembly 110 to the steering device 120 via the lower crossbar mounting tube 101. Referring to FIG. 1b, the handle bar clamps 112 are separable members and engage the upper riser crossbar tube (not shown), wherein the upper riser crossbar tube aids in securing handlebars 100 by locking fasteners 106 such as a threaded bolt. In FIG. 1c, the handle bar clamps 113 are not separable but have a split section 114 that provides sufficient freedom to position the upper riser crossbar tube (not shown) before being secured by the locking fastener such as threaded pinch bolt 106.

Figure 2A:
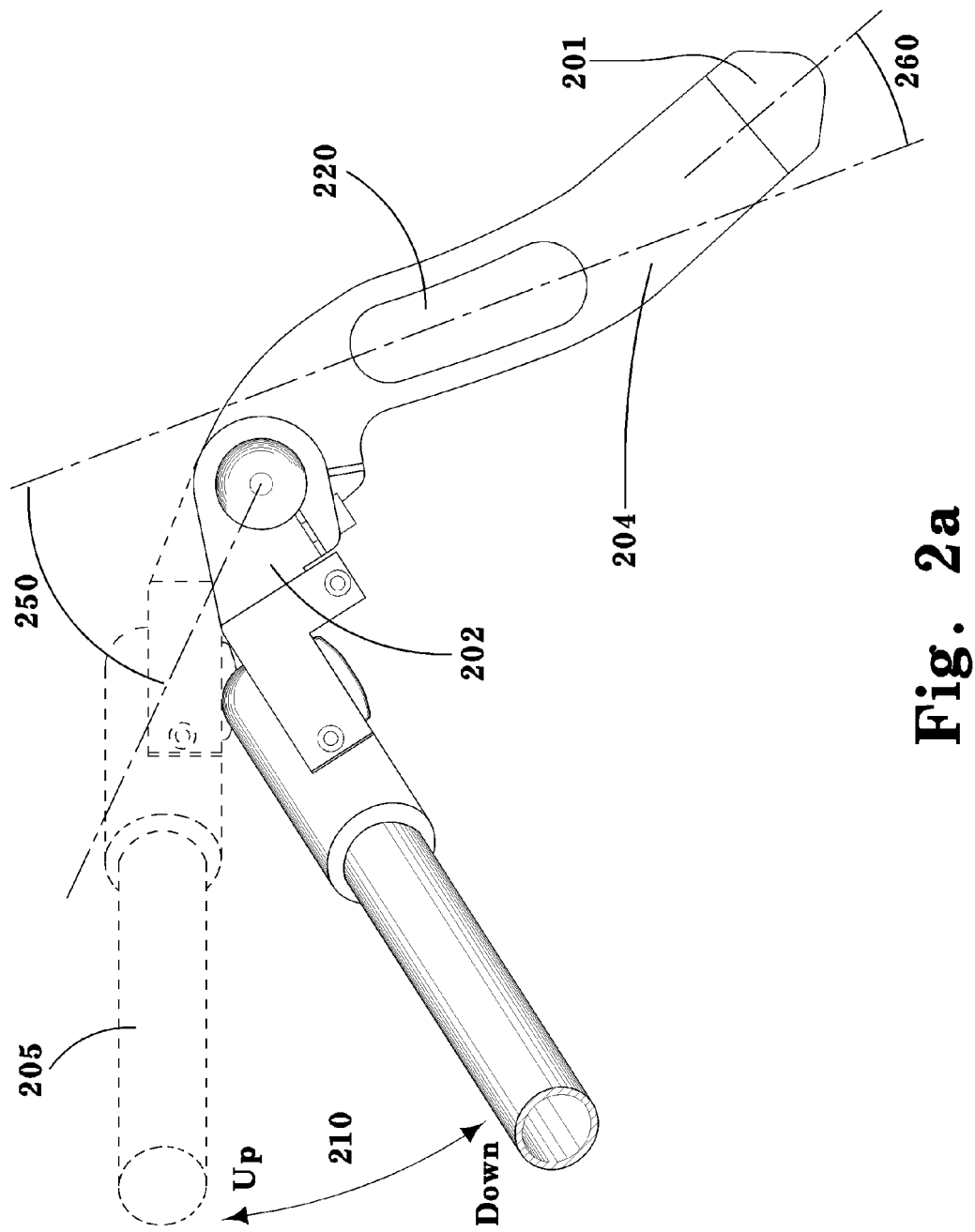
FIG. 2a is a partial perspective view of the handlebar and riser assembly in accordance with an embodiment of the present invention.

FIG. 2a is a side perspective view of the handlebar and riser assembly, illustrating the relationship between the handlebar riser assembly 210 and handlebar 205. As shown, handlebar riser assembly 210 and first pivoting joint 202 provide a first pivoting adjustment range 210 described as pivoting up and down for the handlebar 205. Pivoting adjustment range 210 is defined, at least in part, by rotation stops incorporated in joints 202. Additional details are provided in FIGS. 6a and 6b.

Angle 250 depicts the angle between the major longitudinal axis of handlebar riser 204 and upper clamp axis of upper handlebar clamp region 212. Angle 260 depicts the angle between the major longitudinal axis of handlebar riser 204 and lower adapter unit 205. There can be various cut-outs 220 for aesthetic purposes and also to lighten the weight.

Referring to FIG. 2b and FIG. 2c, a side view perspective of the handlebar 205 in an upper and lower position is shown wherein the adjustment range is defined at least in part by a rotation stop 228. The handlebar riser assembly 210 and first pivoting joint 202 provide a first pivot point for the handlebar 205. In some embodiments the first pivot point 202 may be referred to as a compound member. Pivoting adjustment range 210 is defined, at least in part, by rotation stops provided by a special washer 228 that acts as a safety stop should the clamping pinch bolt 206 loosen up or otherwise be improperly torqued, the handlebar 205 would only move up or down within the range provided by the rotation stop 228. In this embodiment, the rotation stop 228 is held firmly in place with a mounting screw 229.

In FIG. 2b, the highest adjusted stop is shown as the first pivot joint 202 strikes a flat surface of the washer 228. The washer 228 can have many different shapes with a number of flat sides. In FIG. 2c, the lowest adjustment stop is shown wherein the first pivot joint 202 strikes a surface of the washer 228. This positive motion stop can be provided in a number of further embodiments such as having the washer engage corresponding grooves. The washer 228 is shown in further detail in FIG. 6c.

In one embodiment the upper pivot member 202 mounts directly to the riser 210 without employing an upper crossbar.

Figure 3A:
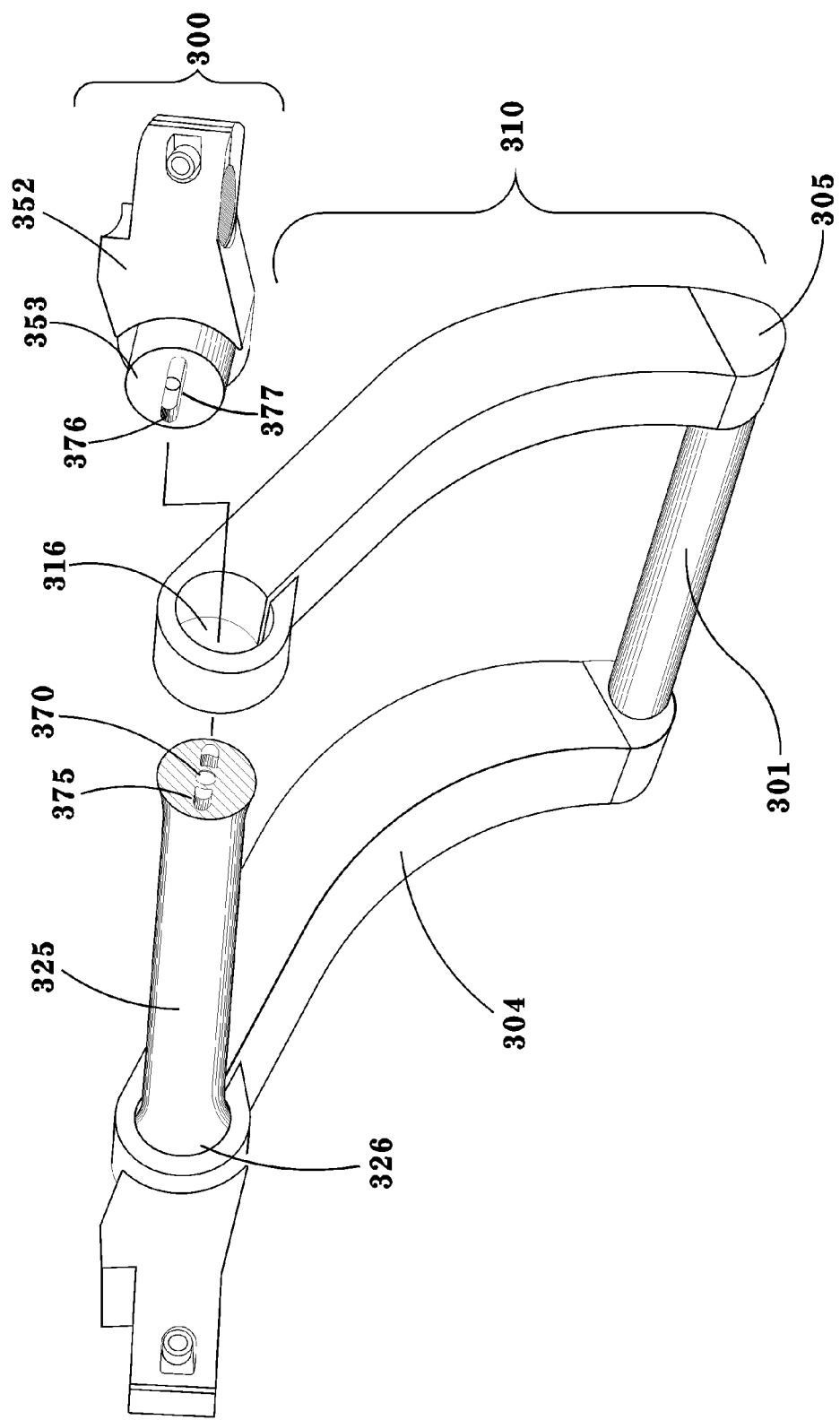
FIG. 3a is a forward perspective view of the riser assembly in accordance with an embodiment of the present invention.

FIG. 3a is a forward-facing (rider's) view perspective of the handlebar and riser assembly. It illustrates a multi-adjustable handlebar assembly section 300 (without a handle portion) and a handlebar mounting riser assembly section 310.

Multi-adjustable handlebar assembly 300 includes compound member 352 that has a mounting stub 353 extending therefrom that is inserted into a corresponding bore 316 of the riser 304. The upper crossbar 325 has tabs 375 that mate with a respective receiving section 376 on the stub 353 to align the compound member 352 such that both compound members on either side of the upper crossbar 325 are aligned with each other and ensure that both handlebars rotate together. A bolt (not shown) can extend through the compound member 352 and into the threaded hole 370 of the upper crossbar 325 thereby securing the compound member 352 to the riser 304. The upper crossbar 325 may include a flared section 326 at the junction with the inner surface of the riser 304.

Handlebar riser mounting assembly 310 includes handlebar risers 304 handlebar adapter unit 305 and mounting tube 301.

Figure 3B:
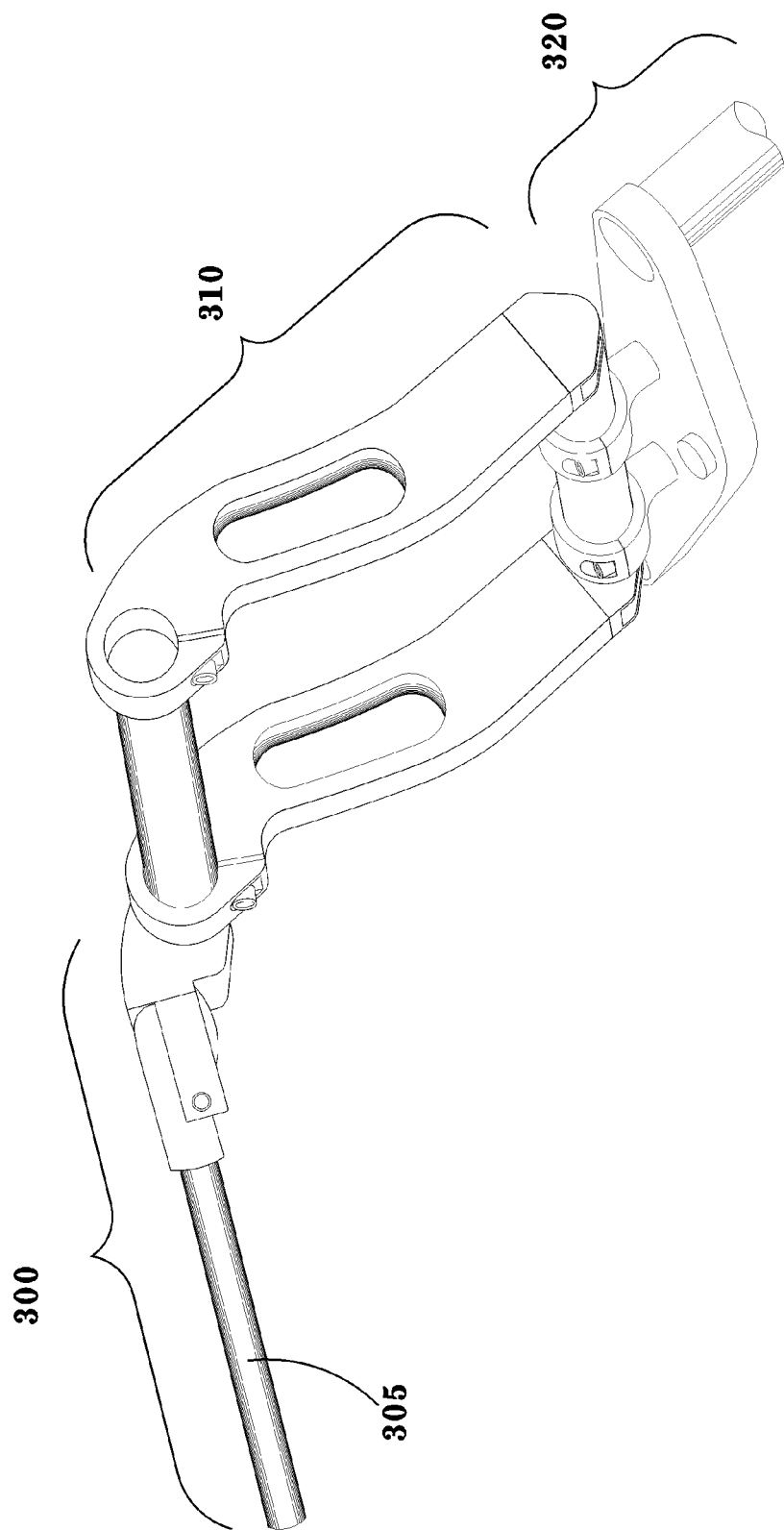
FIG. 3b is a perspective view of one handlebar, the riser assembly, and the steering mount in accordance with an embodiment of the present invention.

Referring to FIG. 3b, a partial perspective view of the handlebars 300 is shown coupled to the riser assembly 310 and correspondingly affixed to the steering mount 320 according to one embodiment. The orientation of the riser assembly 310 is adjustable within the clamps of the steering mount 320 thereby permitting one degree of movement. The handlebars 300 can be further adjusted upwards and downwards employing the compound member such that a further degree of movement is permitted. Furthermore, a further pivot joint on the compound member can allow an inward/outward movement.

FIG. 4a is a top-down view of handlebar assembly 400 and riser assembly 410 illustrating a second pivoting joint rotational member 422. Multi-adjustable handlebar assembly 400 is shown connected to handlebar riser mounting assembly 410 by handlebar upper crossbar mounting tube 425. The handlebar assembly 400 includes the handlebars 405, the compound members 452, and second pivoting joint members 422. Second pivoting joint rotational members 422 provide a second pivoting degree of freedom depicted by adjustment range 430. Adjustment range 430 may be described as pivoting toward or away from an operator. This pivoting may be limited by stops described in more detail in FIGS. 6a and 6b.

According to one embodiment, the lower crossbar mounting tube 401 is a lower crossbar sandwiched between the pair of risers 404, and the upper crossbar mounting tube 425 is an upper crossbar sandwiched between the risers 404. The upper crossbar 425 may extend through the riser 404 and provides the mounting point for the compound member 452. Alternatively the compound member 452 can employ a stub arrangement as described herein to couple the upper crossbar 425 with the compound members. The compound member 452 provides the coupling for the second pivot joint 422 that allows the movement range 430 for the handlebars 405.

Figure 4B:
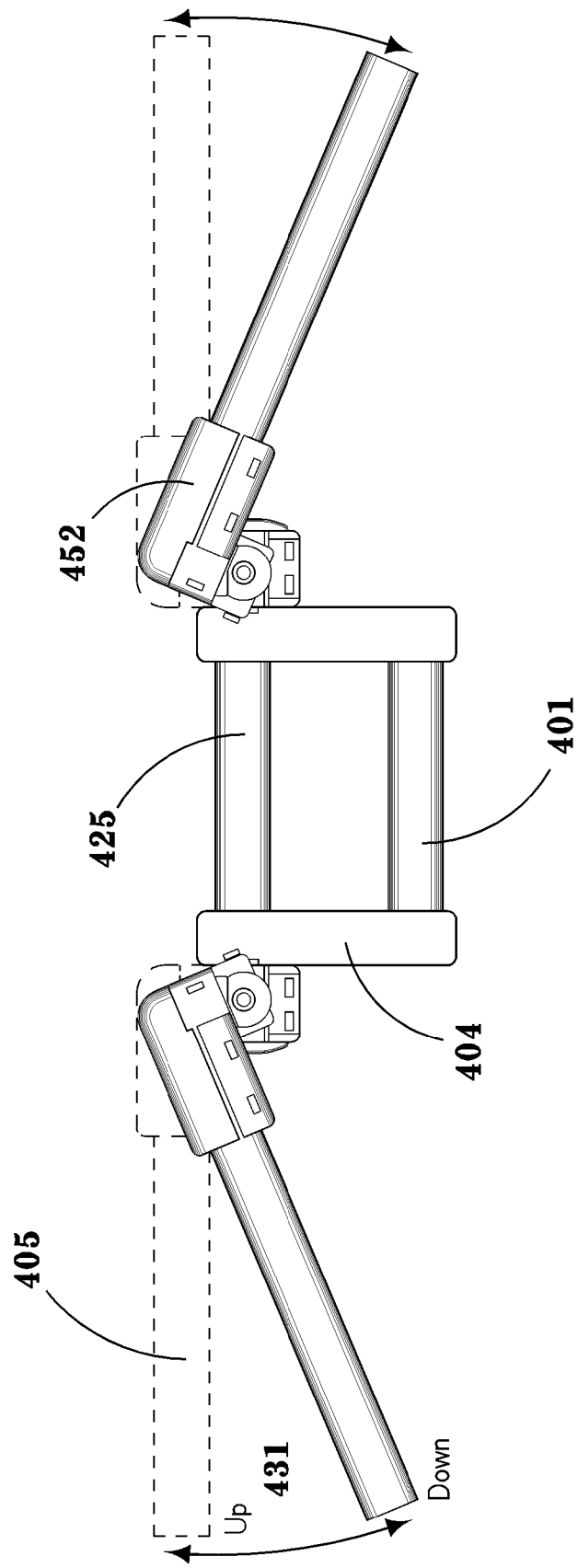
FIG. 4b is a view of the handlebar and riser assembly from the operator's position in accordance with an embodiment of the present invention.

In FIG. 4b, a perspective view from the operator's position is shown for the up/down movement range 431 for the handlebars 405. The lower crossbar 401 engages the steering mount (not shown), and the upper crossbar 425 engages the risers 404 in cooperation with the compound members 452. The first pivot joint or compound member 452 permits an allowable up/down movement range 431, wherein stops of various types as described herein limit the rotation.

Figure 5A:
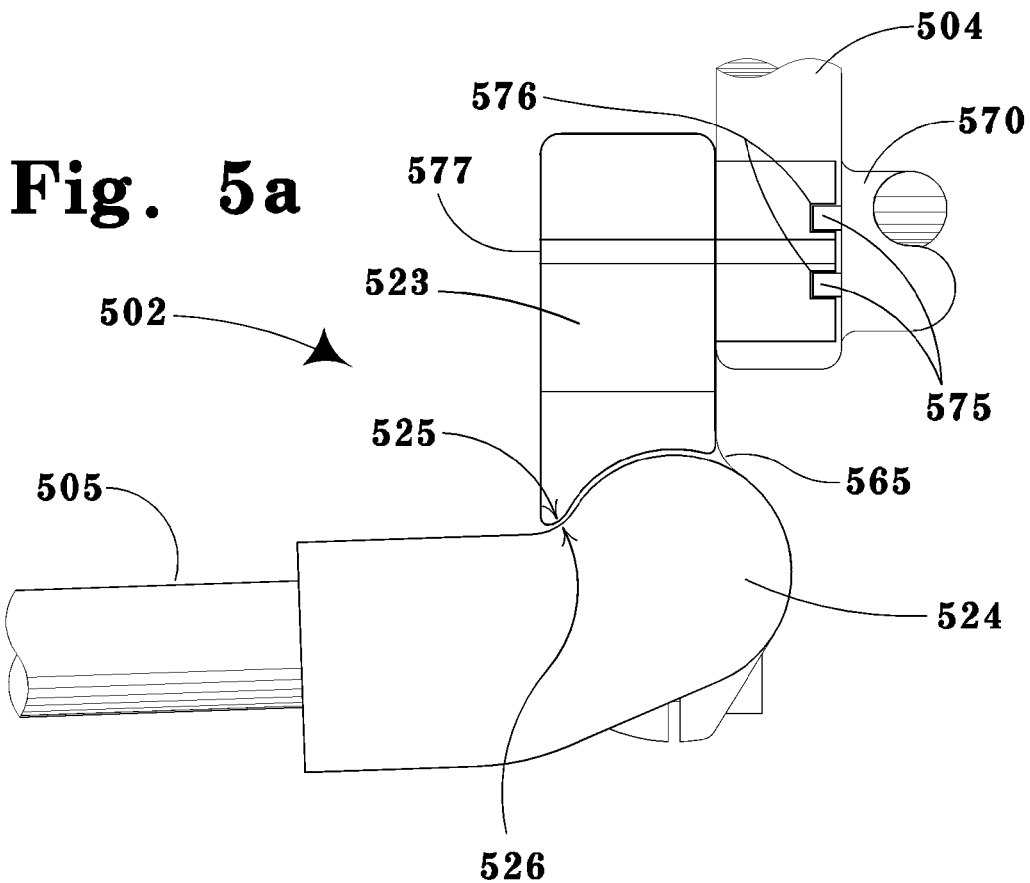
FIGS. 5a and 5b are, respectively, top-down and bottom-up views of multi-adjustable handlebar assembly joints in accordance with an embodiment of the present invention.
Figure 5B:
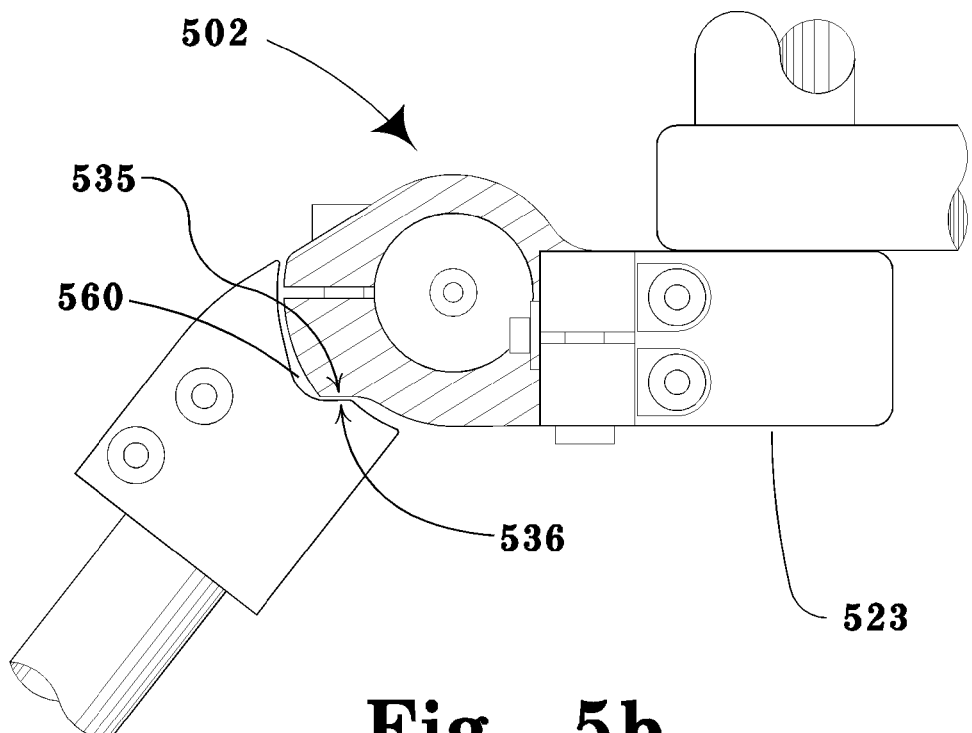

FIGS. 5a and 5b are, respectively, top-down and bottom-up views depicting certain operational and safety components of embodiments of multi-adjustable handlebar assembly pivoting section 502. FIGS. 5a and 5b illustrate a forward stop 525, 526 and a back stop 535, 536 limiting the rotation/movement of the handles 505 in that axis or plane and enhancing the safety to the rider. Forward stop 525, 526 and back stop 535, 536 are described in the context of a two pivot axis embodiment however it also can be applied to a portion of a three pivot axis embodiment of the present invention.

By way of illustration, forward stop 525, 526 and back stop 535, 536 apply to the inwards/outwards movement of the handlebars. Pivot point rotational member 524 is rotatably coupled to the compound member 523. Rotational member 523 and 524 are fashioned/shaped thereby defining the rotating portion and the stopping portions.

Referring again to FIG. 5a, compound rotational member 523 has a forward stop section 525 that engages a corresponding stopping section 526 of the rotating pivot point member 524 thereby prohibiting further forward movement.

There is a gap 565 between the rotating pivot point member 524 and the compound member 523 about the rotational region. Rotating the handlebars 505 forward causes the pivot point rotational member 524 to rotate a pre-determined amount in one direction and causes the compound member forward stop section 525 to converge at the forward stop section 526 of the pivot point member 524 thereby preventing further forward movement of the handlebars.

Each side of handlebar riser 504 is held between second rotational member 523 and upper crossbar 570. Upper crossbar 570 may have flared ends as shown. Alignment can be provided by tabs or keys 575 extending from the upper crossbar 570 into corresponding recess 576 of the mounting stub of the compound member 523. The recess 576 may be, for example, individual depressions or a single slot. Bore 577 provides for a bolt (not shown) extending through the second rotational member 523 and through the handlebar riser 504 and into a threaded receiving portion on the upper crossbar 570. This bolt screws into the threaded portion of the upper crossbar 570 and compresses handlebar riser 504 between second rotational member 523 and upper crossbar 570. The tabs 576 aid in aligning the left and right handlebar joints without indexing such that rotation of the handlebars maintains the alignment automatically.

Now referring to FIG. 5b, rotating the handlebars rearward causes the pivot point member back stop section 536 to engage the backstop 535 of the compound member 523. Consequently, even if the pivot point rotational member 524 rotates unexpectedly, the ranges of rotation in one direction is limited by forward stop and backstop.

Figure 6E:
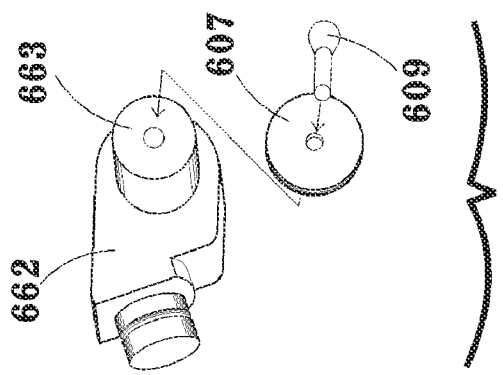
FIG. 6e is an exploded perspective of view of a compound member in a 3 axis embodiment wherein the compound member can be attached to a bore of a handlebar riser assembly via a mounting stub.
Figure 6D:
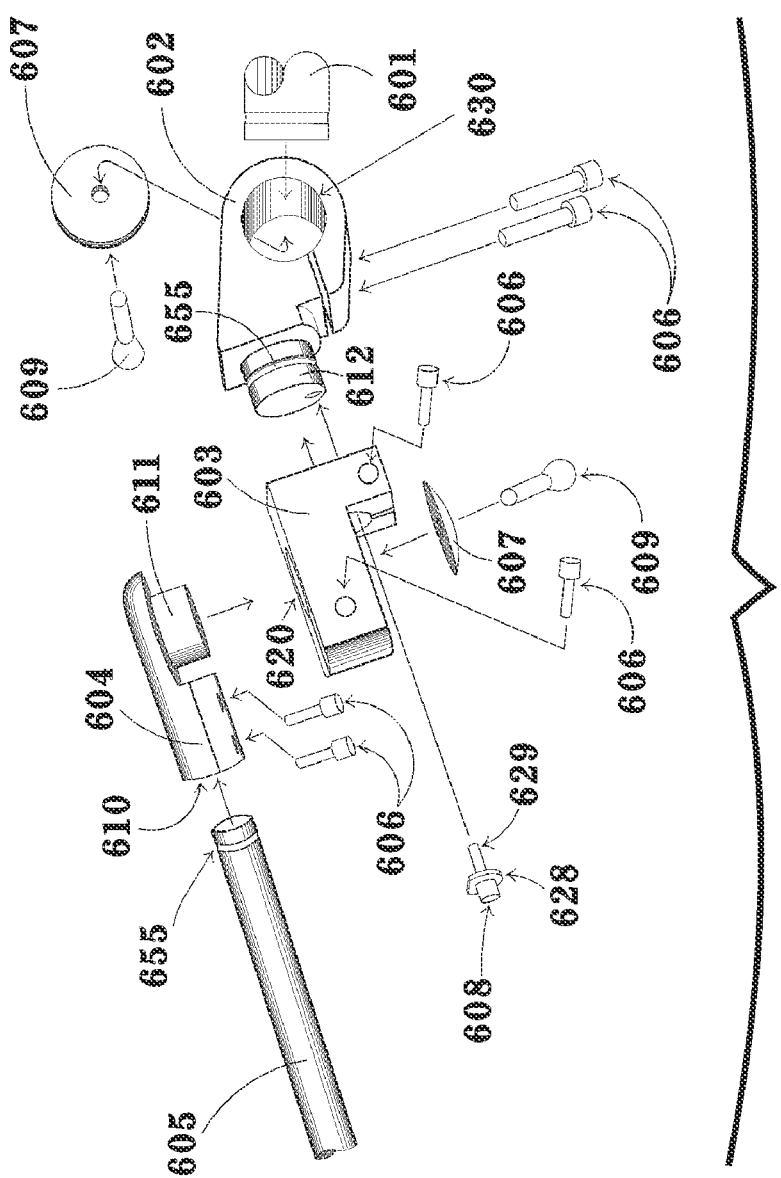
FIG. 6d is an exploded perspective view of the multi-adjustable handlebar assembly joints in accordance with a 3 axis embodiment of the invention

FIGS. 6a and 6d are, respectively, exploded perspective views of embodiments of the two and three axis multi-adjustable handlebar assembly joints. Referring to FIG. 6a, a crossbar mounting member 601 extending from a handlebar riser assembly (not shown) provides a mounting point for a compound members 632, typically in combination with the risers (not shown). About one end of compound member 632 is a handlebar mounting bore 630 receiving one end of the crossbar mounting member 601. At least partially securing handlebar mounting member 601 to compound member 632 are pinch bolts 606. The extended end of the handlebar mounting member 601 can also include a cap 607 and cap fastener 609 that can also aid in securing the crossbar member 601. Handlebar mounting member 601, compound member 632, and cap 607 may be axially aligned.

Referring to FIG. 6b, in accordance with another embodiment of the present invention, a compound member 682 is attached to a bore (not shown) of a handlebar riser assembly (not shown), via a mounting stub 683 wherein the stub extends through the riser portion so that the stub face is flush with the exterior surface of the riser. Note that FIG. 6b is applicable to embodiments which do not include an upper crossbar 325, or at least do not include a crossbar which is aligned with the mounting stub 683. Instead, a cap 607 can be fastened with a cap fastener 609 to handlebar mounting stub 683. Cap 607 and handle mounting stub 683 may be axial aligned with one another. Consequently, compound member 682 is sandwiched between handlebar riser assembly (not shown) and cap 607 as cap fastener is 609 is tightened.

In a further embodiment, the upper crossbar is eliminated and the compound member 682 mounts to the riser via the cap 607 and cap fastener 609.

Referring to FIG. 6c, in accordance with another embodiment of the present invention, a compound member 652 is attached to the upper crossbar (shown as 570 in FIG. 5a) of a handlebar riser assembly, via a handlebar mounting stub 653. Alignment is assisted by keys or tabs from the crossbar (not shown) fitting in recess 676 of the stub 653. The recess 676 may be, for example, individual depressions or a single slot. Bore 677 provides for a bolt (not shown) to be received by a threaded portion in the upper crossbar (not shown). This bolt (not shown) compresses the handlebar riser between compound member 652 and the upper crossbar, locking the left and right handlebar joints in alignment.

Referring again to FIG. 6a, compound member 632 and pivot member 634 are pivotally connected via a pivot stub 611 and a receiving pivot bore 644. Compound member 632 is securely joined to pivot member 634 by a pinch bolt 606. Pivot stub 611 is fashioned with a bore (not shown) that may be concentric with pivot bore 644 to receive a cap 607 and cap fastener 609. Pivot stub 611 may be inserted into one end of pivot bore 644 on the pivot extension 603, seen in FIG. 6b, of the compound member 632, which in this embodiment is integral with the compound member 632. About the other end of pivot bore 644, a cap 607 is positioned and fastened into place with cap fastener 609 thereby safely securing the pivot stub 611. Compound member 632 is sandwiched in between pivot member 634 and cap 607 as cap fastener 609 is drawn tight. Consequently, compound member 632 remains captured even if pinch bolt 606 loosens.

As shown, the handlebar mounting bore 630 is approximately orthogonal to pivot bore 644. One of ordinary skill in the art, however, will readily appreciate that the present invention covers other angular relationships i.e., the angle between handlebar mounting bore 630 and pivot bore 644 maybe greater than or less then ninety degrees. Rather than limiting the present invention, this disclosure conveys the general principle that there is an angular relationship between handle bore 630 and pivot bore 644.

Continuing with FIG. 6a, pivot member 634 has a clampable bore (not shown) to receive a handle portion 605 and is clamped in place by pinch bolts 606. Encircling one end of handle portion 605 is anti-separation grove 655 also referred as an anti-separation grove for handle portion providing a safe securing attachment. A detailed description of anti-separation grove 655 is provided herein. Handle portion 605 provides a surface for the rider to grip. Subsequently, handle portion 605 may be dimensioned to accommodate specific hand sizes. Additionally, handle portion 605 provides a surface for controls (e.g., for brake, clutch, or throttle), switches (e.g., for head lights, tail lights, or signal lights), and accessories e.g., mirror. Accordingly, handle portion 605 may be dimensioned to accommodate specific controls, switches and accessories.

FIG. 6e depicts a further, three pivot axis, joint of a multi-axis adjustable handlebar assembly. A first rotational member 602, through a handlebar mounting bore 610, is affixed to the extended end of handlebar mounting member 601 and is secured by pinch bolts 606. The extended end of the handlebar mounting member 601 is then capped with cap 607 which is fastened in place with cap fastener 609. Handlebar mounting member 601, first rotational member 632, and cap 607 may be axial aligned. Consequently, first rotational member 602 is sandwiched between the riser mounts of the handlebar riser (not shown) and cap 607 as the cap fastener 609 is tightened.

Referring again to FIG. 6e, first rotational member 602 connects to a second rotational member 603 via a connecting stub 612 and a reciprocal connecting bore. First rotational member 602 is securely joined to second rotational member 603 by a pinch bolt 606. Additionally, first and second rotational members, 602 and 603 respectively, are retained together by an anti-separation stop 608.

Anti-separation stop 608 consists of a washer portion 628 and a threaded portion 629. Connecting stub 612 is fashioned with a mating threaded bore 630 to receive threaded portion 629 and is located off-center. Threading anti-separation stop 608 into one or more mating threaded bores 630 causes washer portion 628 to press against second rotational member 603, thereby preventing first rotational member 602 from separating from second rotational member 603.

Additionally, by threading anti-separation stop 608 into mating threaded bore 630, washer portion 628 is eccentrically aligned with the longitudinal axis of connecting stub 612. Consequently, washer portion 628 acts as a stop and prevents second rotational member 603 from rotating completely about connecting stub 612. The washer 628 according to one embodiment is shaped according to certain design criteria such that it acts as a positive motion stop as a safety feature such that the washer is a safety stop should the clamping pinch bolt loosen up or not be properly tightened. By way of illustration, the washer 628 could have three approximately equal sides, or it could be circular and have one or two flat sides. Essentially, the special washer 628 limits the degree of rotation that a single segment can move. The washer 628 may have varied shapes and fits integrally with the mating component. This washer 628 can be attached in many different manners.

Encircling connecting stub 612 is an anti-separation groove 655. Anti-separation groove 655, also referred as anti-separation groove for connecting stub, prevents first rotational member 602 from separating from second rotational member 603 even if pinch bolt 606 loosens. Anti-docket separation groove 655 is discussed further in later portions of this disclosure.

Again referring to FIG. 6e, second rotational member 603 is pivotally connected to a third rotational member 604 via a pivot stub 611 and a receiving connecting bore 620. Second rotational member 603 is securely joined to third rotational member 604 by a pinch bolt 606. Pivot stub 611 is fashioned with a bore (not shown) that may be concentric with pivot stub 611 and receives a cap fastener 609. Pivot stub 611 is inserted into one end of connecting bore 620. About the other end of connecting bore 620, a cap 607 is positioned and fastened into place with cap fastener 609. Second rotational member 603 is subsequently sandwiched in between third rotational member 604 and cap 607 as cap fastener 609 is drawn tight. Consequently, third rotational member 604 remains captured even if pinch bolt 606 loosens.

A third rotational member 604 has a clampable bore (not shown) to receive a handle portion 605. Handle portion 605 is secured in place with pinch bolts 606. Encircling one end of handle portion 605 is anti-separation grove 655 also referred as anti-separation for the handle portion 605, which provides a surface for the rider to grip. Subsequently, handle portion 605 may be dimensioned to accommodate specific hand sizes and shaped in an appropriate manner for the user including curves and bends. Additionally, handle portion 605 provides a surface for controls (e.g., for brake, clutch, or throttle), switches (e.g., for head lights, tail lights, or signal lights), and accessories e.g., mirror. Accordingly, handle portion 605 may be dimensioned to accommodate specific controls, switches and accessories. Furthermore, as handle portion 605 can be separable and independent from other members of the present invention, handle portion 605 may be made for a dissimilar material e.g., carbon fiber.

Referring to FIG. 6e, in accordance with another embodiment of the present invention, a compound member 662 is attached to a bore (not shown) of a handlebar riser assembly (not shown), via a handlebar mounting stub 663. A cap 607 is fastened with a cap fastener 609 to handlebar mounting stub 663. Cap 607 and handle mounting stub 663 may be axial aligned with one another. Consequently, compound member 662 is sandwiched between handlebar riser assembly (not shown) and cap 607 as cap fastener is 609 is tightened.

In operation, the handlebar portion 605 is adjustable along one axis (degree of freedom) by being rotated about pivot stub 611. The handlebar portion can be adjusted along another axis (degree of freedom) about connecting stub 612. Another degree of freedom refers to the handlebar portion 605 also being rotatably adjustable about the handlebar mounting member 601.

While FIG. 6e depicts handle portion 605 as being straight, one skilled in the art will readily appreciate that handle portion 605 may also possess a number of bends and shapes to further enhance safety, ergonomic and aerodynamic advantages. While providing three degrees of freedom, the present invention also incorporates safety features including retention mechanisms and angular stops. The handlebar assembly can be coupled to the riser mounting assembly which itself provides a further adjustable degree of freedom.

Figure 6F:
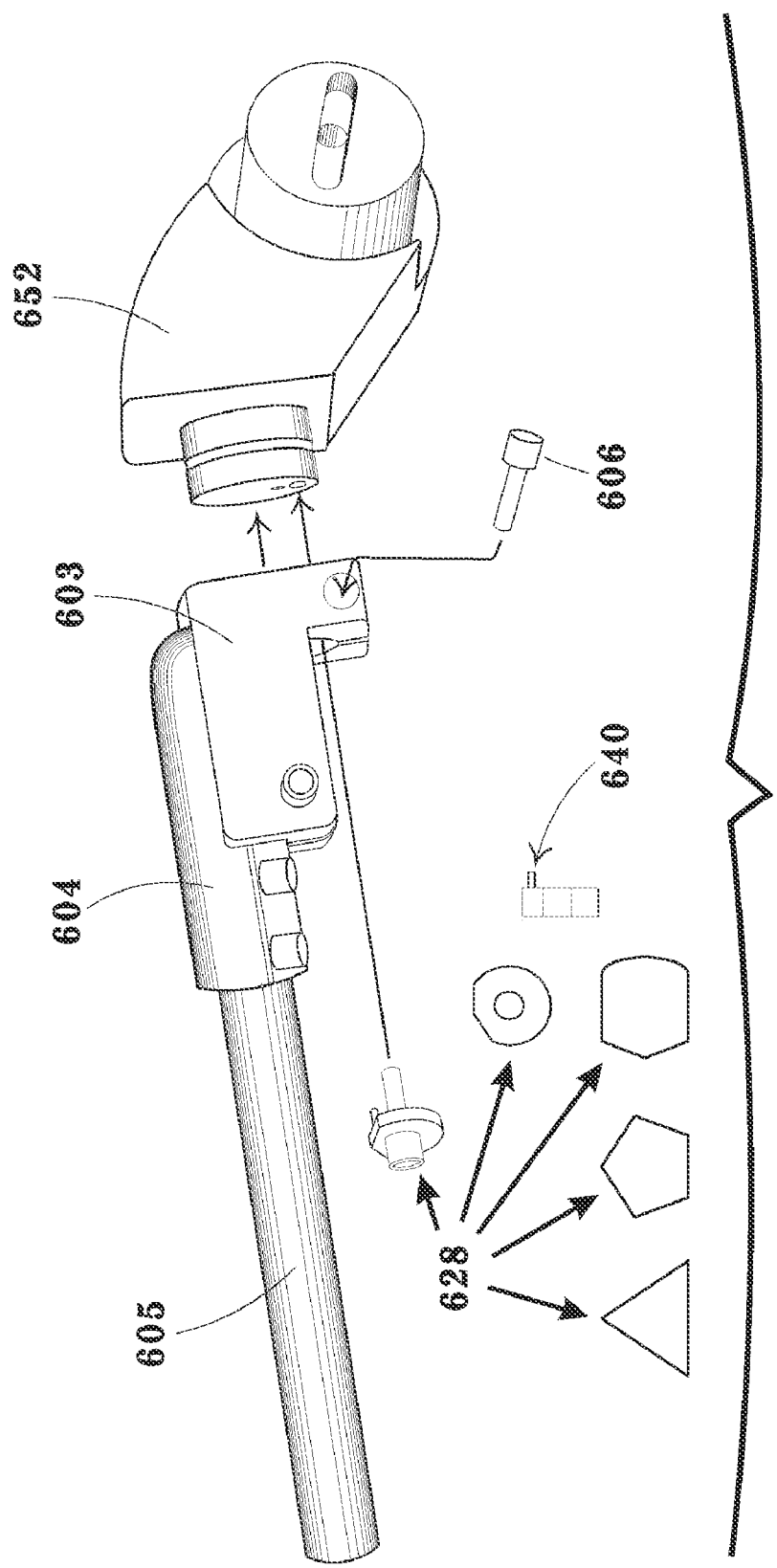
FIG. 6f is an exploded perspective of view of a compound member and handle in a 3 axis embodiment wherein the compound member can be attached to the upper crossbar of a handlebar riser assembly via a handlebar mounting stub.

Referring to FIG. 6f, side perspective view of one embodiment of the handlebar rotation is depicted. According to this direct mount cross bar embodiment the rotational stop 628 extends through the pivot section 603 and engages with the compound member 652, wherein one or more dowel pins 640 of the washer unit 628 engages mating receptacles on the compound member 652, more specifically the stub/boss on the compound member, thereby precisely orienting the rotational stop washer 628 to ensure its proper functionality. As detailed herein, the boss on the stub of the compound member may include a radius groove cut for anti-separation. The rotation stop washer 628 according to one embodiment is a rounded washer with certain flat side edges, however other shapes are within the scope of the invention such as a triangular shaped, polygonic and rounded with some flat regions. If the pinch bolt 606 was not properly torqued and loosens, the then the handlebars 605 will only permit a range of movement.

Figure 7A:
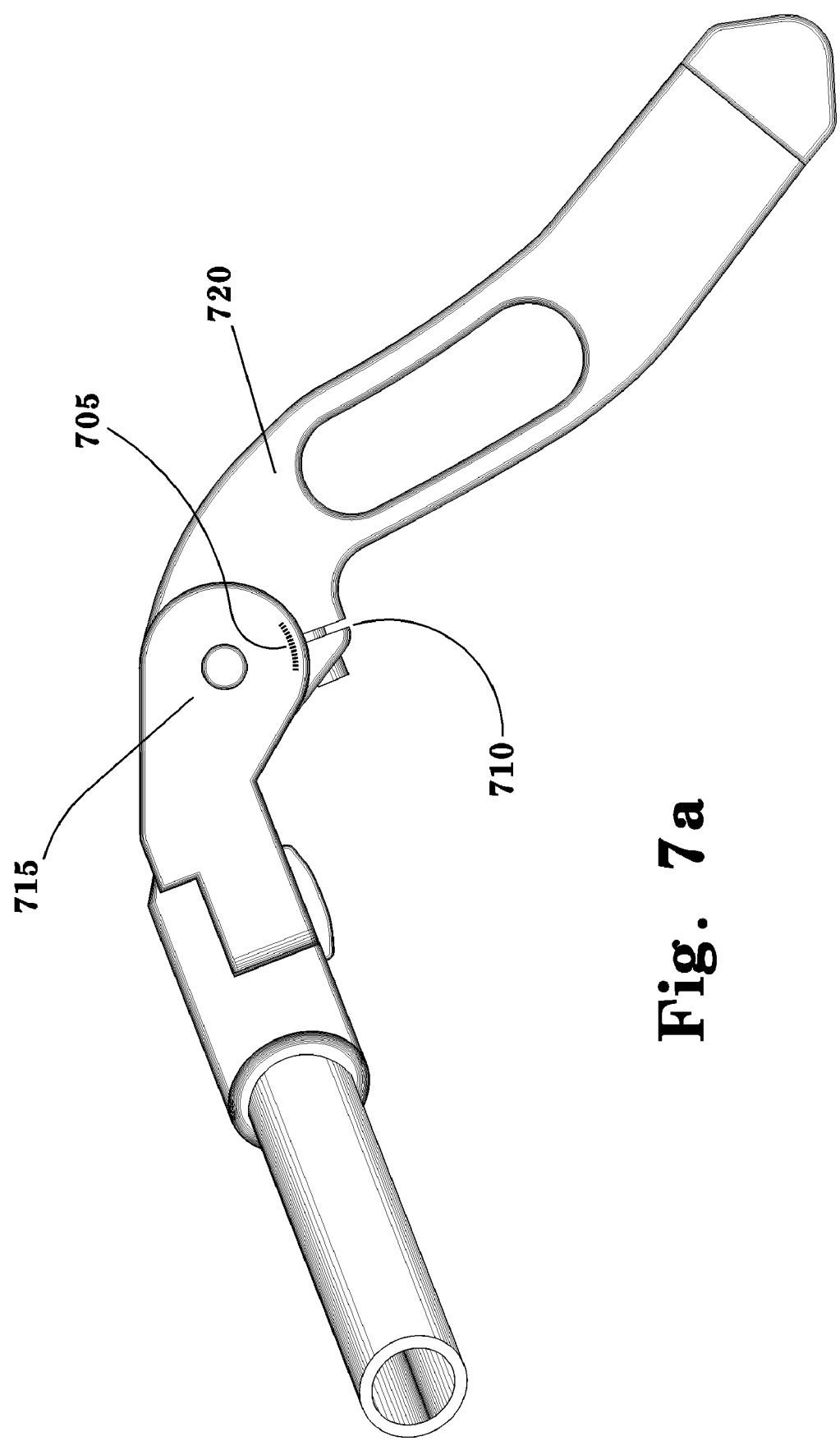
FIG. 7a shows index marking for alignment of the joints in accordance with other embodiments of the invention.

Referring to FIG. 7a, one embodiment for alignment is depicted. In this example, an index marking 705 having a plurality of index marks is provided on a rotating component 715 of the various compound members and pivot joints. These markings help to align the various rotatable sections, for example, the left side and right side of the handlebars. In one embodiment a single mark or reference point 710 is provided on the fixed component 720 such that the user or installer can count the index marks and ensure that the right side and left side are matching on any given axis. Alternatively, the index markings can be on the fixed component 720 and the reference point on the rotating element 715.

Various other embodiments are within the scope of the invention. For example, if the upper crossbar is eliminated as noted in conjunction with FIG. 6b, the index marking 705 is of particular interest as there would be no tabs in the upper crossbar to maintain the alignment between the right and left handlebars.

Figure 7B:
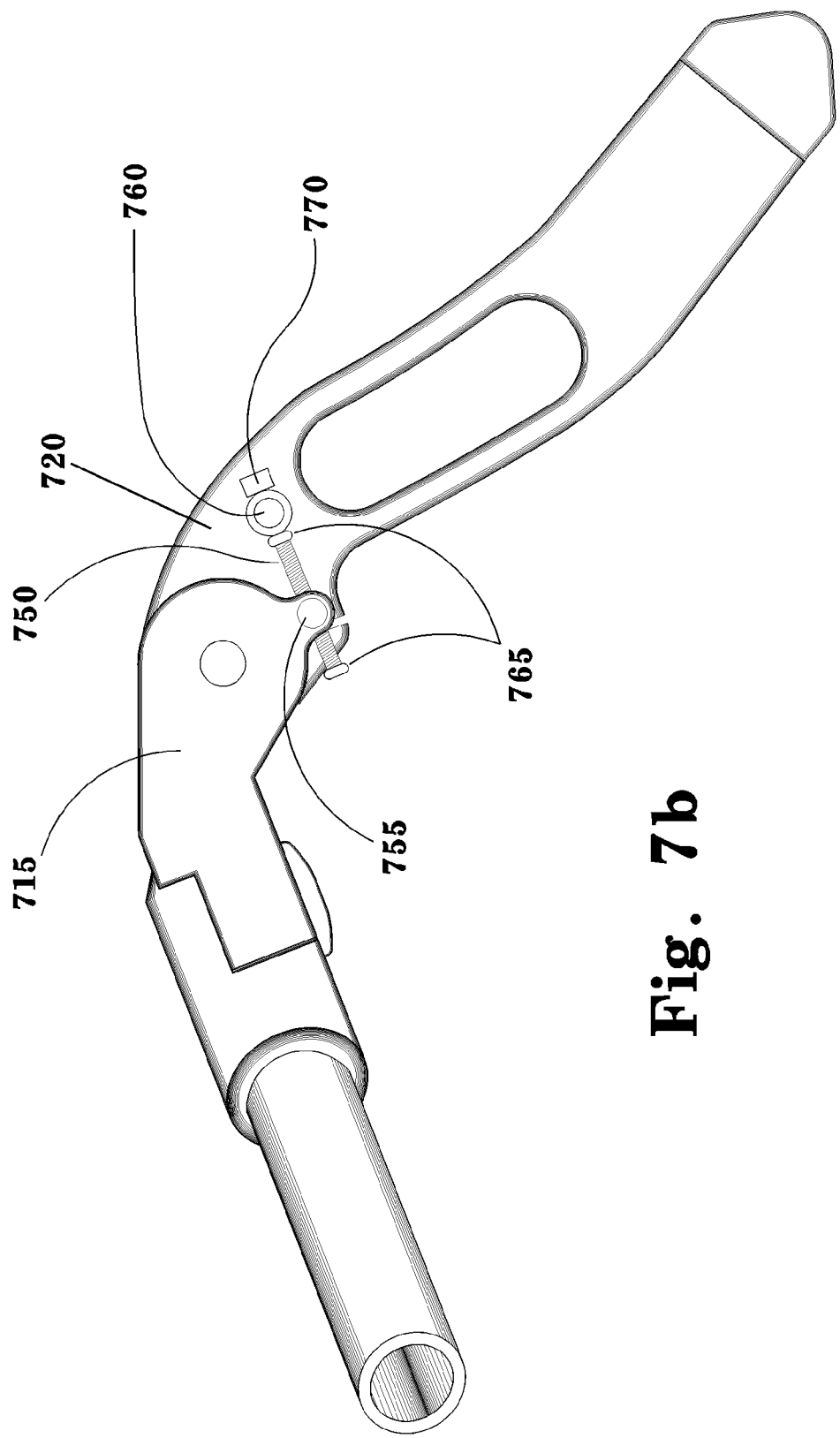
FIG. 7b illustrates a threaded adjuster for the joints in accordance with other embodiments of the invention.

FIG. 7b shows an adjustable alignment system wherein a threaded adjuster can be used on any of the compound members of pivot joints allowing for easy and fine-tuned adjustments. A threaded member 750 rides within a threaded boss 755 such that the adjustable boss travels along the threaded member and thereby adjusts the rotating component 715 in relation to the fixed component 720. According to one embodiment, there are travel stops 765 designating the range for the threaded boss 755. In other embodiments the threaded region of the threaded member 750 would designate the range. The threaded member 750 can be affixed to the stationary member 720 by a stationary pivot boss 760. The threaded member 750 can be turned by a head 770 such as a hex or socket head for making the adjustment wherein turning the head 770 causes the rotating pivot boss 755 to move along the threaded section of the threaded member 750. In one embodiment there is a pinch bolt or fastener for securing the position of the assembly once the adjustment is finalized. The pinch bolt can be integrated with the stationary pivot boss 760 residing on the fixed component 720. In another embodiment the assembly can be internalized such that the threaded member 750 extends to the surface and allows access to the head 770 and a boss portion 760 engages the internal threaded section. The stop can be an internal wall as one of the embodiments. Furthermore, instead of a boss that rides along a threaded member, the threaded member can be used to push or pull the rotatable component. Further variations and embodiments are within the scope of the invention.

As can be seen, the present invention offers a high degree of adjustability by utilizing multiple adjusting members. An increased number of adjusting members, however, requires an increased number of mechanical fasteners securing adjusting members to one another. This would typically increase the opportunities for improper maintenance and probability of mechanical failure, but the present invention integrates a number of elements to enhance safety and control. These include alignment keys, anti-separation grooves, caps, and stops as well as rotation stops.

Alignment keys provide alignment between components on, for example, a common tube or bar. They are projections received by depressions at an interface such as between handlebar joints and a handlebar tube. They align components and prevent rotation of one member about another should a connecting bolt loosen. The operator will be alerted to the unsafe condition, allowing the rider to safely stop the vehicle Anti-separation grooves prevent one member from separating from another member, even if a mechanical fastener (e.g., a pinch bolt) securing both members loosens. Only when the mechanical fastener is completely removed can both members be separated.

An anti-separation caps, as described herein, prevent an inserting/pivoting member from being removed from the receiving/fixed member. While preventing separation, the members will pivot if a mechanical fastener is loosened. Accordingly, an unexpected pivot will alert the operator of an unsafe condition while the anti-separation cap will allow the operator to bring the vehicle to a safe stop and remedy the situation.

Anti-separation stops, as described herein, also prevent one member from separating from another, and additionally prevent one member from freely rotating about another, should a mechanical fastener securing both members fail.

Rotation or pivot stops limit the angular rotation of one member about another. Forward stops limit pivoting in one direction; back stops limit pivoting in a second direction. While forward and back stops limit how much a member pivots, they do not prevent pivoting members from pivoting. If a sufficient amount of force is applied to overcome the fastening abilities of a mechanical fastener, the pivoting member will pivot. This, however, will be limited. The operator will be alerted to the unsafe condition, again allowing the rider to safely stop the vehicle.

Another feature of the present invention is the rigid design of the lower mounting tube assembly. Unlike separate left and right riser designs, the adjustable handlebar mounting risers' integrated design offers greatly reduced axial flex and reduced misalignment. According to one embodiment of the invention, three or more components are bolted or otherwise attached to form a rigid more unitary structure. This also permits use of dissimilar materials. One example includes a steel lower mounting assembly and an aluminum riser assembly.

The shape and length of each member can be configured to cover a wide range of uses including but not limited to motorcycles, ATVs, snowmobiles, stationery or movable machinery and any vehicle or device which requires an operator to steer, adjust or otherwise effect physically with input from the operator's hands.

While embodiments of the present invention offer the utility of being adjustable, accommodating operators of various sizes and riding styles, safety is not compromised. The aforementioned safety structures provide an operator with sufficient control in the event of a mechanical problem and the aforementioned safety structures allow an operator to bring a vehicle or device to a safe stop.

A further embodiment includes the use of fasteners having tamper-proof heads that require special tooling to loosen. The fasteners can also be secured with Loctite® or comparable means for maintaining a secure coupling with the fasteners. For safety and aesthetics, the fasteners are typically recessed so that they do not extend beyond the surface.

The foregoing description of the embodiments of the invention has been presented for the purposes of illustration and description. It is not intended to be exhaustive or to limit the invention to the precise form disclosed. Many modifications and variations are possible in light of this disclosure. It is intended that the scope of the invention be limited not by this detailed description, but rather by the claims appended hereto.

What is claimed is:

1. A multi-axis adjustable handlebar system adapted for use with a motorcycle or other handlebar-steered-motorized vehicles, the handlebar system comprising;

a riser unit having a pair of riser sides coupled together in a fixed, parallel relationship by a lower crossbar which extends between the pair of riser sides and an upper crossbar which extends between the pair of riser sides, the pair of riser sides and the lower crossbar being attached together to form a rigid, unitary structure, said lower crossbar being rotatably connected by a lower engagement mechanism to a steering mount, said riser unit being lockable in orientation relative to said steering mount at any desired orientation within a continuous range of selectable orientations by at least partly disengaging the lower engagement mechanism, rotating the lower crossbar about a lower rotation axis until the desired orientation is reached, and then fully engaging said lower engagement mechanism;

right and left compound members coupled by first engagement mechanisms to right and left ends of said upper crossbar, each of said compound members having in a first section a vertical, flat side parallel to and proximal to an outward facing surface of the corresponding riser side, each of said compound members having in a second section a pair of flat, opposing sides penetrated by a clamping bore forming part of a second engagement mechanism adjacent to said first engagement mechanism, said compound members having fixed orientations relative to said riser unit when the first engagement mechanisms are fully engaged, said compound members and said upper crossbar having a first degree of continuous rotational movement about a first rotation axis relative to said riser unit over a limited first adjustment range when said first engagement mechanisms are at least partly disengaged, said compound members and said upper crossbar remaining interconnected and fixed in their relative orientations during said rotation over said first adjustment range, said first rotation axis being substantially parallel to said lower rotation axis, said limited first adjustment range being determined by at least one first forward rotation stop which limits the limited first adjustment range in a forward direction and at least one first back rotation stop which limits the limited first adjustment range in a backward direction;

right and left pivot members coupled by said second engagement mechanisms to said compound members, said pivot members having fixed orientations relative to said compound members when the second engagement mechanisms are fully engaged, said pivot members having second degrees of continuous rotational movement about second rotation axes relative to said compound members over limited second ranges when the second engagement mechanisms are at least partly disengaged, said limited second ranges being determined by second forward rotation stops which limit the limited second ranges in forward directions and second back rotation stops which limit the limited second ranges in backward directions;

handles connected to said pivot members; and threaded adjustments cooperative with the first engagement mechanisms, rotation of the threaded adjustments providing controllable and continuous rotational adjustment about the corresponding engagement mechanisms, wherein the lower crossbar and the first engagement mechanisms are separated by a distance which is greater than a distance which separates the first engagement mechanisms from the adjacent second engagement mechanisms.

2. The system of claim 1, wherein said compound members further include compound member pivot stubs engaging bores in said riser unit, wherein said compound member pivot stubs are distinct from but are affixed to said upper crossbar.

3. The system of claim 1, wherein said pivot members include rotational stop washers which define said limited second ranges.

4. The apparatus of claim 1, wherein at least one of said first engagement mechanisms and said second engagement mechanisms includes pivot stubs having first anti-separation grooves, said first anti-separation grooves being circular grooves formed in circumferences of said pivot stubs and centered about longitudinal axes of said pivot stubs, said first anti-separation grooves being adapted for engagement with the corresponding engagement mechanisms and for preventing separation of the corresponding engagement mechanisms unless the corresponding engagement mechanisms are fully disengaged.

5. The apparatus of claim 1, wherein said second engagement mechanisms include pivot stubs having threaded bores to receive cap fasteners.

6. The apparatus of claim 1, wherein for each compound member said first section is rotatably coupled to said second section by a third engagement mechanism that provides continuous rotation of the second section relative to the first section about a third rotation axis, the third rotation axis being perpendicular to both the first rotation axis and the second rotation axis.

7. The apparatus of claim 6, wherein said third engagement mechanisms include connecting stubs having second anti-separation grooves, said second anti-separation grooves being circular grooves formed in circumferences of said connecting stubs and centered about longitudinal axes of said connecting stubs, said second anti-separation grooves being adapted for engagement with the third engagement mechanisms and for preventing separation of the first sections from the second sections unless the third engagement mechanisms are fully disengaged.

8. The apparatus of claim 6, further comprising anti-separation stops threadably cooperative with said third engagement mechanisms.

9. The apparatus of claim 1, wherein the first engagement mechanism includes index markings.

10. The apparatus of claim 6, further comprising at least one rotation stop interposed between each of said first and second sections and configured to limit said rotation of said first sections relative to said second sections to limited third ranges.

11. The apparatus of claim 1, wherein said second rotation axes are oriented approximately orthogonal to said first rotation axis.

12. A multi-axis adjustable handlebar system adapted for use with a motorcycle or other handlebar-steered-motorized vehicles, the handlebar system comprising:

a riser unit having a pair of riser sides coupled together in a fixed, parallel relationship by a lower crossbar, said lower crossbar extending between the riser sides, the pair of riser sides and the lower crossbar being attached together to form a rigid, unitary structure, said lower crossbar being rotatably connected by a lower engagement mechanism to a steering mount, said riser unit having a fixed orientation relative to said steering mount when the lower engagement mechanism is fully engaged, said riser unit being lockable in orientation relative to said steering mount at any desired orientation within a continuous range of selectable orientations by at least partly disengaging the lower engagement mechanism, rotating the lower crossbar about a lower rotation axis until the desired orientation is reached, and then fully engaging said lower engagement mechanism;

right and left compound members rotatably coupled to said riser unit proximate upper ends of said riser sides via first engagement mechanisms including first pivot stubs engaging first connecting bores, said compound members providing first degrees of continuous rotational adjustment of said compound members about a first rotation axis of said first pivot stubs, said first rotation axis being substantially parallel to said lower rotation axis;

first locking mechanisms configured so as to inhibit said rotational adjustments of said compound members about said first pivot stubs when said first locking mechanisms are fully engaged, and to enable said rotational adjustments of said compound members about said first pivot stubs when said first locking mechanisms are at least partly disengaged;

compound member rotation stops interposed between said compound members and said riser units and configured so as to limit said rotational adjustments of said compound members about said first pivot stubs to limited first adjustment ranges when said first locking mechanisms are at least partly disengaged, said limited first adjustment ranges being determined by first forward rotation barriers which limit the limited first adjustment ranges in a forward direction and first back rotation barriers which limit the limited first adjustment ranges in a backward direction;

right and left pivot members coupled by second engagement mechanisms to said compound members, said pivot members having second degrees of continuous rotational adjustment about second rotation axes which are substantially perpendicular to the first rotation axis of said first pivot stubs;

second locking mechanisms configured so as to inhibit said rotational adjustments of said pivot members about said second rotation axes when said second locking mechanisms are engaged, and to enable said rotational adjustments of said pivot members about said second rotation axes when said second locking mechanisms are at least partly disengaged;

pivot member rotation stops interposed between said pivot members and said compound members, said pivot member rotation stops being configured so as to limit said rotational adjustments of said pivot members about said second rotation axes to limited second adjustment ranges when said second locking mechanisms are at least partly disengaged; and handles connected to said pivot members, wherein said lower crossbar and said first pivot stubs are separated by a distance which is greater than a distance which separates said first pivot stubs from said second engagement mechanisms.

13. The multi-axis adjustable handlebar system of claim 12, further comprising an upper crossbar extending between said upper ends of the riser sides.

14. The multi-axis adjustable handlebar system of claim 1, wherein the pair of riser sides and the lower crossbar are rigidly fabricated as a single unit.

15. The multi-axis adjustable handlebar system of claim 12, wherein the pair of riser sides and the lower crossbar are fabricated as a single unit.

16. The multi-axis adjustable handlebar system of claim 13, wherein said first pivot stubs are rotationally engaged with said upper crossbar.

17. The multi-axis adjustable handlebar system of claim 12, wherein each of said compound members has in a first section a vertical, flat side parallel to and proximal to an outward facing surface of the corresponding riser side, each of said compound members having in a second section a pair of flat, opposing sides penetrated by a clamping bore forming part of the second engagement mechanism.

18. The multi-axis adjustable handlebar system of claim 12, further comprising threaded adjustments cooperative with the first pivot stubs and first connecting bores, rotation of the threaded adjustments providing controllable and continuous rotational adjustment about the corresponding rotation axes.

19. The apparatus of claim 17, wherein for each compound member said first section is rotatably coupled to said second section by a third engagement mechanism that provides continuous rotation of the second section relative to the first section about a third rotation axis that is perpendicular to both the first rotation axis and the second rotation axis.

* * * * *

UNITED STATES PATENT AND TRADEMARK OFFICE
CERTIFICATE OF CORRECTION

PATENT NO.      : 8,230,758 B1
APPLICATION NO. : 11/465863
DATED           : July 31, 2012
INVENTOR(S)     : Harry Greb Eddy It is certified that error appears in the above-identified patent and that said Letters Patent is hereby corrected as shown below:

Column 1
Line 14, delete "multi-access", insert --multi-axis--

Signed and Sealed this
Eighteenth Day of December, 2012

David J. Kappos
*Director of the United States Patent and Trademark Office*